(12) United States Patent
Varma et al.

(10) Patent No.: US 7,957,295 B2
(45) Date of Patent: Jun. 7, 2011

(54) ETHERNET PERFORMANCE MONITORING (75) Inventors: Vishnu Kant Varma, Santa Clara, CA (US); Wenwei Weng, Milpitas, CA (US); Samer Salam, Vancouver (CA); Lio Cheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 11/934,576

(22) Filed: Nov. 2, 2007

(65) Prior Publication Data

US 2009/0116497 A1    May 7, 2009

(51) Int. Cl.
H04L 12/26 (2006.01)
G06F 11/00 (2006.01)
G06F 15/16 (2006.01)
H04J 3/06 (2006.01)

(52) U.S. Cl. ......... 370/241; 370/231; 370/508; 709/233

(58) Field of Classification Search ............ 370/231, 370/232, 236, 236.1, 236.2, 241, 241.1, 252, 370/508, 509, 519; 709/233, 234, 237, 220, 709/221, 223, 224
See application file for complete search history.

(56) References Cited

U.S. PATENT DOCUMENTS

| | | | | |
|---|---|---|---|---|
| 5,878,032 A * | 3/1999 | Mirek et al. | ................. | 370/252 |
| 6,545,979 B1 * | 4/2003 | Poulin | ....................... | 370/241.1 |
| 6,594,704 B1 * | 7/2003 | Birenback et al. | ............ | 709/238 |
| 6,601,098 B1 * | 7/2003 | Case et al. | .................... | 709/224 |
| 6,742,031 B1 * | 5/2004 | Fontenot | ...................... | 709/224 |
| 6,885,641 B1 * | 4/2005 | Chan et al. | .................... | 370/252 |
| 6,917,971 B1 * | 7/2005 | Klein | ............................. | 709/224 |
| 7,336,613 B2 * | 2/2008 | Lloyd et al. | .................... | 370/237 |
| 7,457,868 B1 * | 11/2008 | Guo | ................................ | 709/224 |
| 2005/0099952 A1 * | 5/2005 | Mohan et al. | ................. | 370/241 |
| 2006/0018266 A1 * | 1/2006 | Seo | ................................ | 370/252 |
| 2006/0159008 A1 * | 7/2006 | Sridhar et al. | ................ | 370/216 |
| 2006/0274791 A1 * | 12/2006 | Garcia et al. | .................. | 370/508 |
| 2006/0285501 A1 * | 12/2006 | Damm | ........................... | 370/252 |
| 2007/0121523 A1 * | 5/2007 | Morandin | ..................... | 370/252 |
| 2007/0140126 A1 * | 6/2007 | Osswald et al. | ........... | 370/236.2 |
| 2008/0019282 A1 * | 1/2008 | Alaria et al. | ................... | 370/252 |
| 2008/0031146 A1 * | 2/2008 | Kwak et al. | .................... | 370/250 |
| 2009/0094651 A1 * | 4/2009 | Damm et al. | .................. | 725/93 |

OTHER PUBLICATIONS

IEEE P802.1ag/D8.1, Draft Standard for Local and Metropolitan Area Networks, Virtual Bridged Local Area Networks, Amendment 5, Connectivity Fault Management, Jun. 18, 2007.
ITU-T, Y.1731, OAM Functions and Mechanisms for Ethernet Based Networks, May 2006.

* cited by examiner

*Primary Examiner* — Warner Wong
(74) *Attorney, Agent, or Firm* — Brinks Hofer Gilson & Lione (57) ABSTRACT

One embodiment is a source router that monitors the performance of an Ethernet network. The source router generates an Ethernet connectivity check request frame that includes a transmission timestamp, and transmits the Ethernet connectivity check request frame to a destination router. The source router receives a reply from the destination router that is transmitted in response to receiving the Ethernet connectivity check request frame and determines a round trip time between the source router and the destination router based on a time of receipt of the reply and the transmission timestamp.

24 Claims, 5 Drawing Sheets

ETHERNET PERFORMANCE MONITORING

TECHNICAL FIELD

The present disclosure relates generally to performance monitoring of computer and telephony networks.

BACKGROUND

Computer and telephony networks are typically required to perform in a best effort manner and it is therefore essential to monitor network performance and network faults on these networks. For example, for Internet Protocol ("IP") networks, network applications may require an IP service provider ("ISP") to monitor, as a part of a service level agreement ("SLA") between an ISP and a user/client, performance metrics such as data packet loss, round trip time and/or inter-packet jitter (i.e., inter-packet latency in arrival time) in a network. Metrics for other layers of the IP network, such as an Ethernet layer, may also need to be monitored. The service provider and users/clients therefore need a way to measure network performance metrics to ensure that the agreed level of service is maintained.

DESCRIPTION OF EXAMPLE EMBODIMENTS

Overview

One embodiment is a source router that monitors the performance of an Ethernet network. The source router generates an Ethernet connectivity check request frame that includes a transmission timestamp, and transmits the Ethernet connectivity check request frame to a destination router. The source router receives a reply from the destination router that is transmitted in response to receiving the Ethernet connectivity check request frame and determines a round trip time between the source router and the destination router based on a time of receipt of the reply and the transmission timestamp.

EXAMPLE EMBODIMENTS

One embodiment is a system for monitoring the performance of the Ethernet layer of a data network. An Ethernet connectivity check request frame is generated by a source router, and the resulting information returned by a destination router, which may also be an Ethernet connectivity check request frame, enables the source router to determine many metrics and parameters that allow for performance monitoring.

Figure 1:
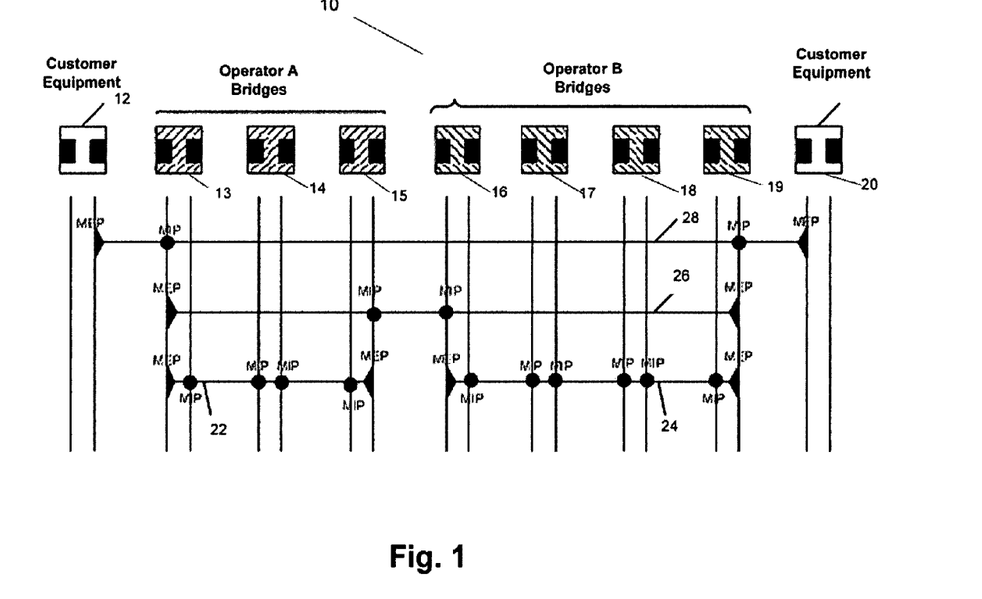
FIG. 1 is a block diagram of an Ethernet network in accordance with one embodiment.

FIG. 1 is a block diagram of an Ethernet network 10 in accordance with one embodiment. Network 10 includes multiple routers 12-20. Network 10 as shown in FIG. 1 is in the Ethernet domain which operates at Layer 2 (i.e., the data link layer) of the Open Systems Interconnection ("OSI") seven layer model. In one embodiment, the Layer 3 (i.e., the network layer) of network 10 is the Internet Protocol ("IP") domain.

In one embodiment, network 10 is comprised of Virtual Bridged Local Area Networks and operates in accordance with the Institute of Electrical and Electronics Engineer ("IEEE") 802.1ag proposed standard for connectivity fault management ("CFM"). In general, IEEE 802.1ag or CFM provide capabilities for detecting, verifying, and isolating connectivity failures in Virtual Bridged Local Area Networks.

FIG. 1 shows the various levels which may exist in a given Ethernet domain, and each level may have various endpoints (e.g., maintenance endpoints or "MEPs") and intermediate points or nodes (e.g., maintenance intermediate points or "MIPs"). The maintenance intermediate points may be owned by independent operators and may be leased by service providers. Maintenance endpoints may belong to service providers and a maintenance intermediate point for a service may be a maintenance endpoint for an operator. As maintenance endpoints lie at the edge of a domain, the maintenance endpoints may actively source CFM messages/frames.

For example, the operator A and the operator B bridges may connect customer equipment routers 12 and 20. On operator level 22 (associated with operator A) there may accordingly be two MEPs for operator A, with four MIPs connecting the two MEPs. Similarly, on operator level 24 (associated with operator B) there may be two MEPs, with six MIPs connecting the MEPs. On provider level 26 there may also be two MEPs and two MIPs. Similarly, on the customer level 28 there may be two MEPs and two MIPs.

Figure 2:
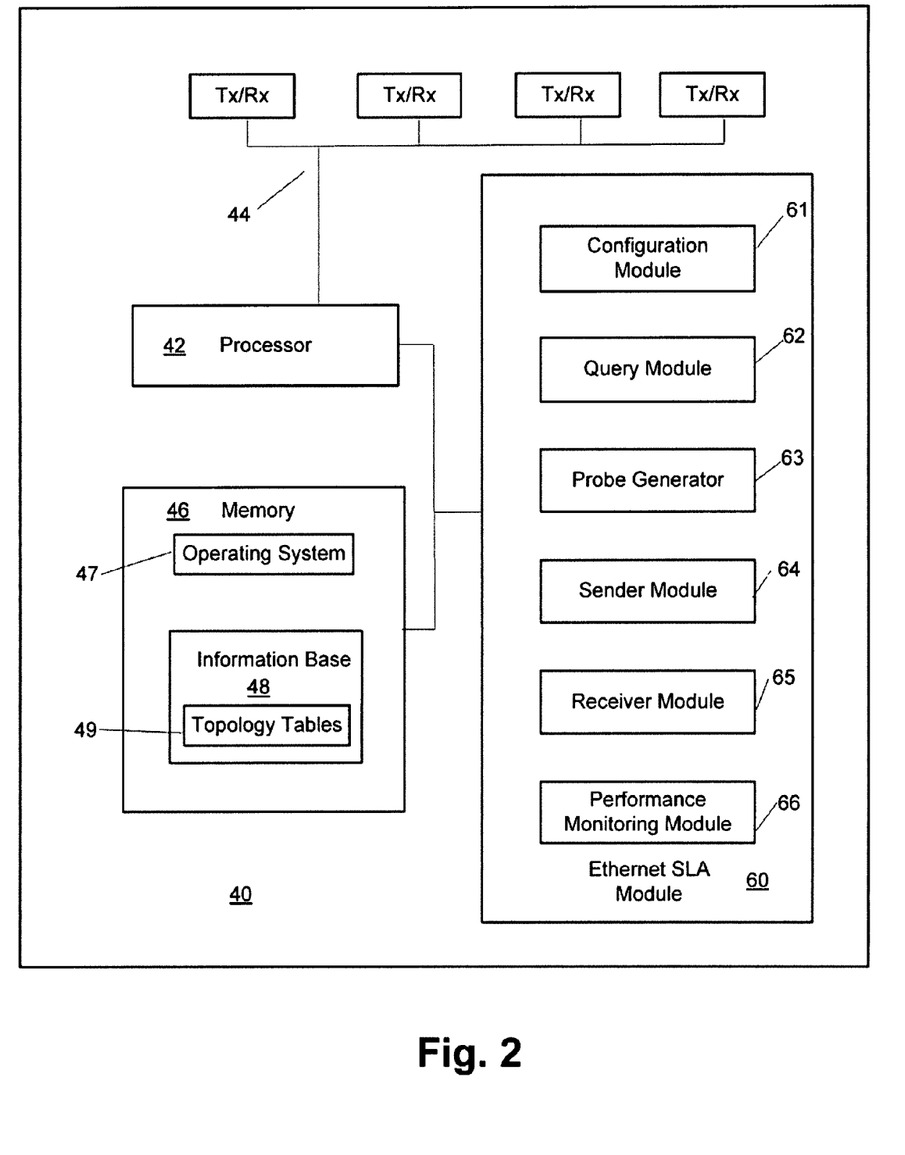
FIG. 2 is a block diagram of a router in accordance to one embodiment that can generate or respond to Ethernet SLA probes on the Ethernet network of FIG. 1.

In one embodiment, a customer equipment Ethernet endpoint router, such as routers 12 and 20 of FIG. 1, generates Ethernet SLA probes in order to measure various performance metrics existing at Layer 2, or responds to Ethernet SLA probes. In one embodiment, the Ethernet SLA probes are either Ethernet echo probes or Ethernet jitter probes. FIG. 2 is a block diagram of a router 40 in accordance to one embodiment that can generate or respond to Ethernet SLA probes. Router 40 may operate as a source node, destination node, or intermediate node. Router 40 may be any device that can receive and forward Ethernet frames at Layer 2, including a switch or bridge. In one embodiment, router 40 is a 7600 series router from Cisco Systems, Inc.

Router 40 includes at least one processor 42 coupled to a plurality of interfaces 44 that input (Rx) and output (Tx) traffic, in the form of various types of packets or frames, within a network (e.g., network 10 of FIG. 1). Interfaces 44 may be joined by an interconnect fabric (not shown) such as, e.g., a crossbar interconnection switch or high-speed bus. Processor 42 is coupled to a memory 46 that stores instructions that are executed by processor 42 as well as other data. Stored in a portion of memory 46 is an operating system 47. In one embodiment, operating system 47 is the Internetwork Operating system ("IOS") from Cisco Systems, Inc. In one embodiment, operating system 47, when executed by processor 42, executes software processes such as an information base 48 and an Ethernet SLA module 60. The functionality of information base 48 and Ethernet SLA module 60 can also be implemented in hardware, or any combination of hardware and software.

Information base 48 includes topology tables 49 (which may also be referred to as "forwarding" or "discovery" tables) which may be populated by an underlying topology-gathering protocol. In one embodiment, the topology-gathering protocol is a connectivity fault management ("CFM") manager, such as IEEE 802.1ag, that maintains a database of endpoints. The CFM manager may further define maintenance domains and relationships between maintenance domains, may describe protocols and procedures used by maintenance points to maintain and diagnose connectivity faults within a maintenance domain, and may provide for future expansion of capabilities of maintenance points and their protocols.

In one embodiment, Ethernet SLA module 60 includes a configuration module 61 which is an interface to an external user to configure the Ethernet SLA operations via a Command Line Interface ("CLI") or a Simple Network Management Protocol ("SNMP"). In one embodiment, the user may configure individual Ethernet echo probe or Ethernet jitter probe operations (discussed below) and associated performance metrics. Module 60 further includes a query module 62 to query topology tables 49 to identify endpoints. In one embodiment, an Ethernet endpoint is identified by domain, virtual local area network identifier ("VID") and maintenance point identifier ("MPID"). Module 60 further includes a probe generator 63 to generate, configure and schedule one or more probe packets or frames. The probe frames may be generated, configured and scheduled based on the instructions received by configuration module 61 and the information on the identified endpoints obtained from topology tables 49. In one embodiment, probe generator 63 generates echo probe or jitter probe frames. These probe frames allow for the measurement of various performance metrics for Layer 2 paths, such as frame loss, jitter, round trip time ("RTT"), etc.

Module 60 further includes a sender module 64 and a receiver module 65. Sender module 64 transmits the generated probe frames to the identified endpoints. Receiver module 65 receives probe frames back from the endpoints. The transmission of the generated probe frames and the receipt of the probe frames are used to assess network performance. Module 60 further includes a performance monitoring module 66 that calculates performance metrics based on frames that are received from a destination router in response to the transmission of echo or jitter probe frames and stores performance monitoring statistics.

Figure 3:
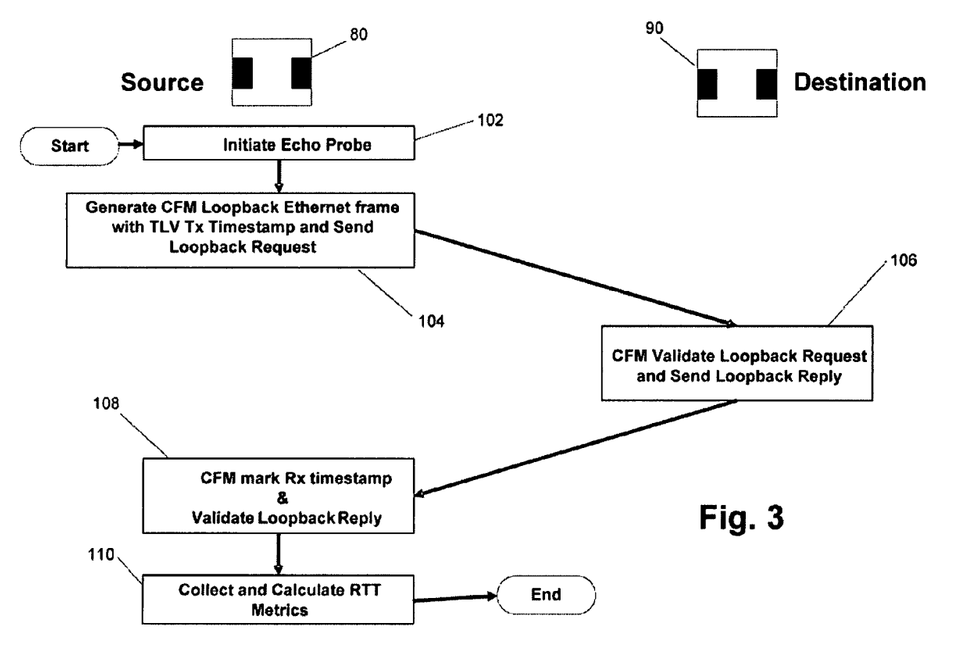
FIG. 3 is a flow diagram of the functionality of a source router and a destination router in accordance with one embodiment when monitoring the performance of the Ethernet network of FIG. 1 by generating an Ethernet echo probe.

FIG. 3 is a flow diagram of the functionality of a source router 80 (i.e., an initiator) and a destination router 90 (i.e., a responder) in accordance with one embodiment when monitoring the performance of an Ethernet network by generating an Ethernet echo probe. In one embodiment, the functionality of the flow diagram of FIG. 3, and the flow diagram of FIGS. 4 and 5 below, is implemented by software stored in memory or other computer readable or tangible medium, and executed by a processor. In other embodiments, the functionality can be performed by hardware, or any combination of hardware and software.

In one embodiment, source router 80 includes the same functionality as router 40 of FIG. 2, and supports the basic IEEE 802.1ag loopback protocol, or can generate Ethernet Layer 2 connectivity check request frames that solicit a reply that carries the timestamp unchanged. Source router 80 sends enhanced CFM loopback frames or packet data units ("PDUs") that include at least one of the CFM Type, Length, Values ("TLVs") discussed below. A TLV is a method of encoding variable length and/or optional information in a PDU. In one embodiment, destination router 90 is any type of router that complies with IEEE 802.1ag or otherwise provides the functionality of FIG. 3, or may be any type of router that returns any received CFM loopback frame to the source router. The flow diagram of FIG. 3 is for an echo probe, which provides a measurement of the round trip delay between source router 80 and destination router 90.

At 102, the Ethernet echo probe is initiated. In one embodiment, user interaction with configuration module 61 is used to initiate the echo probe.

At 104, the Ethernet echo probe is generated in the form of an enhanced CFM loopback request frame that carries a TLV with an embedded transmission timestamp. The loopback frame provides the function of an Ethernet Layer 2 connectivity check request frame that solicits a reply that carries the timestamp unchanged. The loopback request is sent from source router 80 to destination router 90.

At 106, destination router 90 receives and CFM validates the loopback request and sends the standard loopback reply in accordance with IEEE 802.1ag. Router 90 is not required to reply with an enhanced CFM frame having a TLV with embedded information. The standard loopback reply will include the timestamp unchanged, without any new logic required by router 90 beyond compliance with IEEE 802.1ag.

At 108, source router 80 marks a receive timestamp of the reply and validates the loopback reply.

At 110, using the transmit and receive timestamps, source router 80 collects and calculates RTT metrics, which can be used to determine a round trip time from router 80 to router 90 and back.

Figure 4:
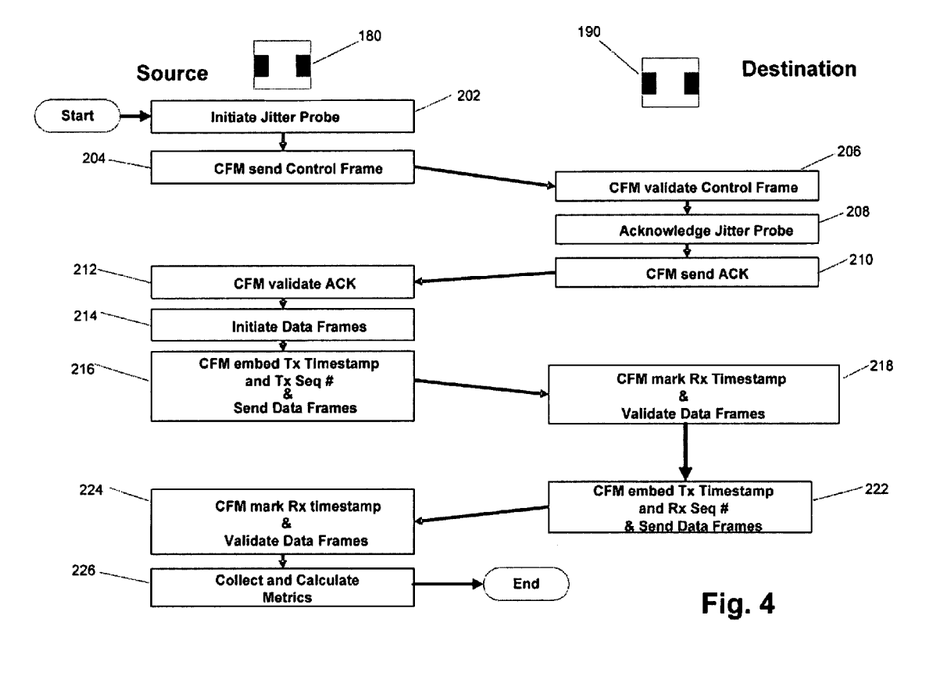
FIG. 4 is a flow diagram of the functionality of a source router and a destination router in accordance with one embodiment when monitoring the performance of the Ethernet network of FIG. 1 by generating an Ethernet jitter probe.

FIG. 4 is a flow diagram of the functionality of a source router 180 and a destination router 190 in accordance with one embodiment when monitoring the performance of an Ethernet network by generating an Ethernet jitter probe. In one embodiment, source router 180 and destination router 190 include the same functionality as router 40 of FIG. 2 and comply with IEEE 802.1ag. Source router 180 sends enhanced CFM loopback frames that include some of the TLVs discussed below. Destination router 190 also sends enhanced CFM loopback frames that include some of the TLVs discussed below.

Destination router 190 includes an information base which is used to maintain states of all the connections from various sources. The state of each source in one embodiment is maintained as an entry in a hash table. The entry is identified by a unique key, which is formed by using the source Media Access Code ("MAC") address and the source jitter probe id, which is unique for a given source, thereby resulting in a unique key for each Ethernet jitter probe running on a source. Destination router 190 maps the incoming jitter frames to an entry in the hash table using the key and then updates the receive sequence number of the frame. The frame's receive and send timestamps are introduced in the frame by extensions of the CFM layer. The control frame, which is sent to destination router 190 at the beginning of the operation lets destination router 190 know for how long the entry is to be kept in the hash table for a given MAC and probe id combination.

At 202, the Ethernet jitter probe is initiated. In one embodiment, user interaction with configuration module 61 is used to initiate the Ethernet jitter probe.

At 204, source router 180 sends a CFM control frame. The control frame informs destination router 190 that an Ethernet jitter probe operation is about to start. The control frame will include TLVs that provide information such as the length of time to keep the entry in the hash table and the probe id, which will be used to construct the unique key from the MAC address and the probe id. The following TLVs may be included with the CFM control frame:

(1) Type: Probe-id; Possible-values: max probe id allowed;
(2) Type: Duration; Possible-values: time for which to keep an entry in the hash table. This may depend on the number of frames that are being sent in a given jitter operation and the inter-frame time.

In one embodiment, source router 180 will embed a secure "magic word" in the control frame using an encrypted signature such as an Message-Digest algorithm 5 ("MD5") signature. This allows destination router 190 to authenticate source router 180. Further, in one embodiment, an acknowledgement for the control frame is needed before any further frames can be sent to destination router 190. To ensure reliability, in one embodiment the control frames are sent to destination router 190 three times if an acknowledgement is not received.

At 206, destination router 190 CFM validates the control frame. At 208, destination router 190 acknowledges the jitter probe. At 210 destination router 190 sends an acknowledge frame. The acknowledge frame is sent back to source router 180 in response to the control frame after a successful entry in the hash table is made. The acknowledge frame in one embodiment will include the probe-id of the probe which initiated the control frame and the type of the frame (i.e., acknowledge frame).

At 212, source router 180 CFM validates the acknowledgment frame and at 214 it initiates enhanced CFM data frames. At 216, the data frames are enhanced with TLVs that embed a transmission time stamp and sequence number and are sent to destination router 190. The following TLVs may be included in the enhanced CFM data frames:

(3) Type: Send sequence number; Possible values: max-number of frames that can be sent in a jitter operation;
(4) Type: Probe-id at source; Possible-values: max allowable probe id allowed.

At 218, destination router 190 marks the receive timestamp and validates the received data frames.

At 222, destination router 190 generates and sends enhanced CFM data frames that include TLVs with embedded transmission timestamp and receive sequence number and sends the data frames. A following TLV may be included:

(5) Type: Receive sequence number; Possible values: same as send sequence number.

At 224, source router 180 marks the receive time stamp and validates the received data frames.

At 226, source router 180 collects and calculates jitter probe metrics. The calculated jitter probe metrics may include:

Number of jitter and latency samples;
Round trip time and number of round trip times;
Unidirectional latency Min/Max/Average (Source to Destination ("SD"), Destination to Source ("DS"));
Unidirectional packet loss including tail drop, out of sequence and late arrival frames;
Unidirectional jitter measurements Min/Max/Average (SD, DS);
Unidirectional positive jitter measurement Min/Max/Average (SD, DS);
Unidirectional negative jitter measurement Min/Max/Average (SD, DS);
Standard deviation of Jitter, RTT for SD, DS;
Successive frame loss;
Operation State;
Latest Return Code;
Number of Success;
Number of Failure;
RTT Sum and Sum Square for off the box calculations of standard deviation;
Latency Sum and Sum square (SD, DS); and
Jitter Sum and Sum Square (SD, DS).

Figure 5:
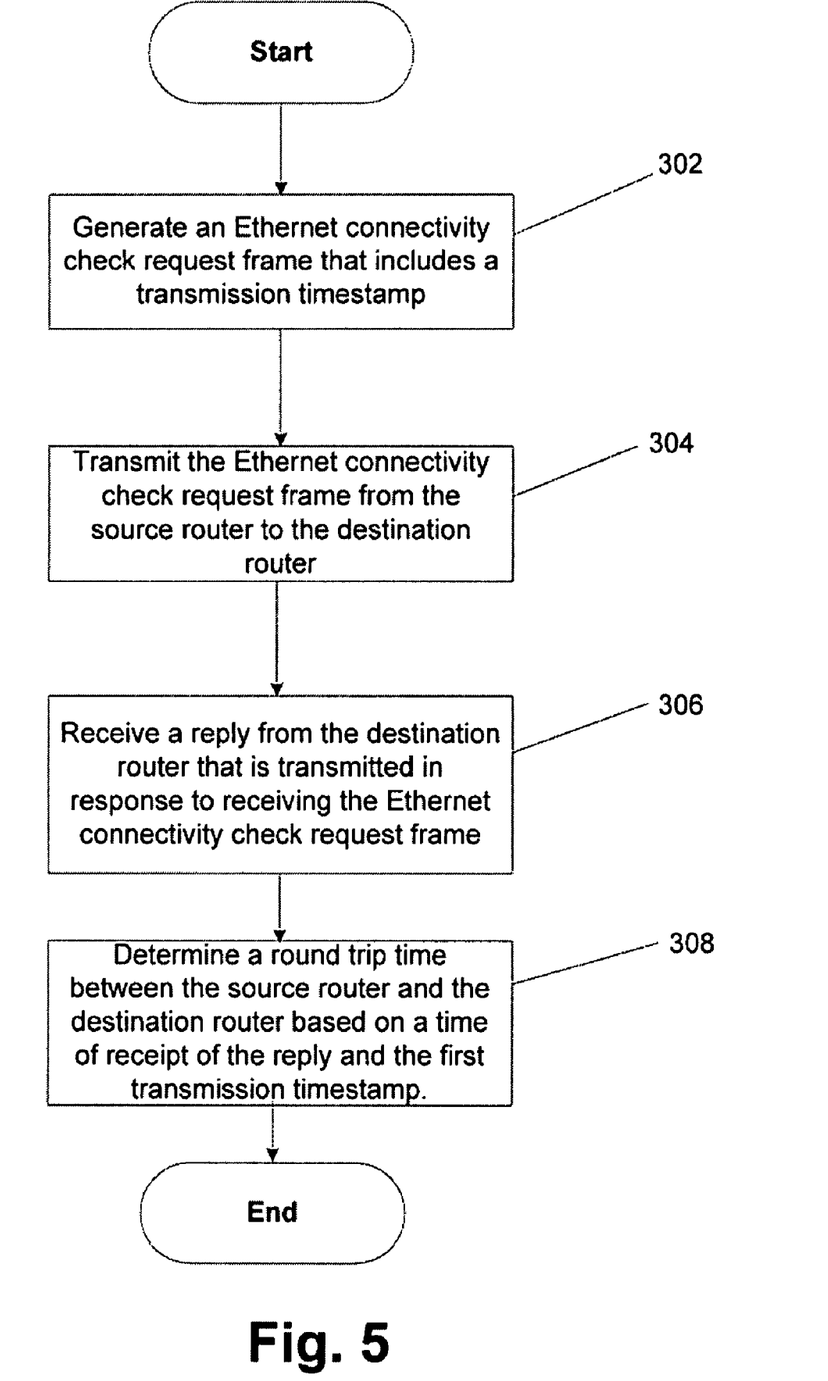
FIG. 5 is a flow diagram of the functionality of a source router in accordance with one embodiment when monitoring the performance of an Ethernet network by generating an Ethernet connectivity check request frame.

FIG. 5 is a flow diagram of the functionality of a source router in accordance with one embodiment when monitoring the performance of an Ethernet network by generating an Ethernet connectivity check request frame.

At 302, an Ethernet connectivity check request frame that includes a transmission timestamp is generated.

At 304, the Ethernet connectivity check request frame is transmitted from the source router to the destination router.

At 306, the source router receives a reply from the destination router that is transmitted in response to receiving the Ethernet connectivity check request frame.

At 308, a round trip time between the source router and the destination router is determined based on a time of receipt of the reply and the first transmission timestamp.

As disclosed, embodiments allow a source router in the Ethernet domain to determine RTT metrics with a destination router using only a CFM manager such as IEEE 802.1ag or its equivalent, and enhanced connectivity check frames (e.g., a loopback request). Other performance SLA metrics can be determined by providing additional functionality beyond IEEE 802.1ag in the destination router. In contrast, other known solutions for performance monitoring of an Ethernet network require much more extensive infrastructure and specialized software for destination routers in order to determine RTT metrics alone.

For example, the International Telecommunication Union ("ITU-T") Y.1731 standard provides mechanisms for Operation, Administration and Maintenance ("OAM") in Ethernet networks. However, in order to provide some of the functionality of the embodiments disclosed above, both a source router and destination router would have to implement ITU-T Y.1731, including support of Delay Measurement Message ("DMM") and specific frame formats. In contrast, example embodiments disclosed above provide the ability to measure round trip delay at the Ethernet service layer by relying solely on the destination device being conformant with IEEE 802.1ag CFM or its equivalent, and without requiring the performance management tools of ITU-T Y.1731. In one embodiment, this is achieved by generating an enhanced CFM loopback frames that includes a TLV with an embedded transmission timestamp. In general, this allows a source router to perform "single-sided" Ethernet layer performance management. Additional metrics can be further obtained with a jitter probe by having the destination router also generate enhanced CFM frames with TLVs in addition to the IEEE 802.1ag functionality. Further, embodiments can provide a method for the destination router to authenticate the source router through an enhanced control frame in order to make the exchange of frames a more secure procedure.

Several embodiments are specifically illustrated and/or described herein. However, it will be appreciated that modifications and variations of are covered by the above teachings and within the purview of the appended claims without departing from the spirit and intended scope of the invention.

What is claimed is:
1. An apparatus comprising:
a probe generator to generate a first Ethernet connectivity check request frame that comprises a first transmission timestamp embedded in a Type, Length, Value (TLV), wherein the first Ethernet connectivity check request frame is a loopback request frame;

a query module that queries an information base to identify a destination router for the first Ethernet connectivity check request frame, wherein the information base is stored in a memory;

wherein the information base is indexed by a unique key for each of a plurality of endpoints, the unique key is formed by using the source Media Access Code (MAC) address and a probe id;

a sender module coupled to the probe generator to transmit the first Ethernet connectivity check request frame from a source router to the destination router;

a receiver module to receive a reply from the destination router that is transmitted in response to receiving the first Ethernet connectivity check request frame; and a performance monitoring module coupled to the receiver module to determine a round trip time between the source router and the destination router based on a time of receipt of the reply and the first transmission timestamp.

2. The apparatus of claim 1, wherein the source router and destination router operate under a connectivity fault management (CFM) manager.

3. The apparatus of claim 2, wherein the CFM manager is IEEE 802.1ag and the first Ethernet connectivity check request frame is an IEEE 802.1ag loopback request frame.

4. The apparatus of claim 1, wherein the probe generator generates a control Ethernet connectivity check request frame that comprises a probe identifier; and the receiver module receives an acknowledgment from the destination router that is transmitted in response to receiving the control Ethernet connectivity check request frame.

5. The apparatus of claim 1, wherein the first Ethernet connectivity check request frame further comprises a transmit sequence number.

6. The apparatus of claim 5, wherein the reply is a second Ethernet frame that comprises a second transmission timestamp and a receive sequence number.

7. The apparatus of claim 6, wherein the performance monitoring module determines a jitter measurement based on the second Ethernet frame.

8. The apparatus of claim 1, wherein the reply carries the first transmission timestamp.

9. The apparatus of claim 1, further comprising: a connectivity fault management (CFM) manager to maintain the information base including protocols and procedures used by the plurality of endpoints including the destination router.

10. The apparatus of claim 1, wherein an encrypted word for authenticating the server is a message digest algorithm 5(MD5) signature.

11. A method comprising:

generating a first Ethernet connectivity check request frame that comprises a first transmission timestamp embedded in a Type, Length, Value (TLV), wherein the first Ethernet connectivity check request frame is a loopback request frame;

querying an information base to identify a destination router, wherein the information base is stored in a memory;

wherein the information base is indexed by a unique key for each of a plurality of endpoints, the unique key is formed by using the source Media Access Code (MAC) address and a probe id;

transmitting the first Ethernet connectivity check request frame from a source router to the destination router;

receiving a reply from the destination router that is transmitted in response to receiving the first Ethernet connectivity check request frame; and determining a round trip time between the source router and the destination router based on a time of receipt of the reply and the first transmission timestamp.

12. The method of claim 11, wherein the source router and destination router operate under a connectivity fault management (CFM) manager.

13. The method of claim 12, wherein the CFM manager is IEEE 802.1ag and the first Ethernet connectivity check request frame is an IEEE 802.1ag loopback request frame.

14. The method of claim 11, further comprising:

generating a control Ethernet connectivity check request frame that comprises an identifier; and receiving an acknowledgment from the destination router that is transmitted in response to receiving the control Ethernet connectivity check request frame.

15. The method of claim 11, wherein the first Ethernet connectivity check request frame further comprises a transmit sequence number.

16. The method of claim 15, further comprising: receiving a second Ethernet frame from the destination router in response to the first Ethernet connectivity check request frame, wherein the second Ethernet frame comprises a second transmission timestamp and a receive sequence number.

17. The method of claim 16, further comprising: determining a jitter measurement based on the second Ethernet frame.

18. The method of claim 11, further comprising:

maintaining the information database including protocols and procedures used by the plurality of endpoints including the destination router.

19. An apparatus comprising:

means for generating a first Ethernet connectivity check request frame that comprises a first transmission timestamp embedded in a Type, Length, Value (TLV), wherein the first Ethernet connectivity check request frame is a loopback request frame;

means for querying an information base to identify a destination router;

wherein the information base is indexed by a unique key for each of a plurality of endpoints, the unique key is formed by using the source Media Access Code (MAC) address and a probe id;

a transmitter to transmit the first Ethernet connectivity check request frame from a source router to the destination router;

a receiver to receive a reply from the destination router that is transmitted in response to receiving the first Ethernet connectivity check request frame; and means for determining a round trip time between the source router and the destination router based on a time of receipt of the reply and the first transmission timestamp.

20. The apparatus of claim 19, further comprising:

a connectivity fault management (CFM) manager to maintain the information base including protocols and procedures used by the plurality of endpoints including the destination router.

21. Logic encoded in one or more tangible media for execution and when executed operable to:

generate a first Ethernet connectivity check request frame that comprises a first transmission timestamp embedded in a Type, Length, Value (TLV), wherein the first Ethernet connectivity check request frame is a loopback request frame;

query an information base to identify a destination router;

wherein the information base is indexed by a unique key for each of a plurality of endpoints, the unique key is formed by using the source Media Access Code (MAC) address and a probe id;

transmit the first Ethernet connectivity check request frame from a source router to the destination router;

receive a reply from the destination router that is transmitted in response to receiving the first Ethernet connectivity check request frame; and determine a round trip time between the source router and the destination router based on a time of receipt of the reply and the first transmission timestamp.

22. The logic of claim 21, wherein the source router and destination router operate under a connectivity fault management (CFM) manager.

23. The logic of claim 22, wherein the CFM manager is IEEE 802.1ag and the first Ethernet connectivity check request frame is an IEEE 802.1ag loopback request frame.

24. The logic of claim 21, further operable to:

maintain the information database including protocols and procedures used by the plurality of endpoints including the destination router.

* * * * *

UNITED STATES PATENT AND TRADEMARK OFFICE
CERTIFICATE OF CORRECTION

| | | |
|---|---|---|
| PATENT NO. | : 7,957,295 B2 | |
| APPLICATION NO. | : 11/934576 | |
| DATED | : June 7, 2011 | |
| INVENTOR(S) | : Varma et al. | |

It is certified that error appears in the above-identified patent and that said Letters Patent is hereby corrected as shown below:

In the Claims

In column 7, claim 11, line 54, before "connectivity check request" replace "Ethemet" with --Ethernet--.

In column 8, claim 19, line 32, before "connectivity check" replace "Ethermet" with --Ethernet--.

Signed and Sealed this
Tenth Day of April, 2012

David J. Kappos
*Director of the United States Patent and Trademark Office*